US006641148B2

(12) United States Patent
Schmidt

(10) Patent No.: US 6,641,148 B2
(45) Date of Patent: Nov. 4, 2003

(54) MOBILE HEAVY TOOL LIFT AND SUPPORT WITH LOCKABLE STORAGE

(76) Inventor: Richard Schmidt, 26814 S. Mooney Blvd. Space A-11, Visalia, CA (US) 93277

(*) Notice: Subject to any disclaimer, the term of this patent is extended or adjusted under 35 U.S.C. 154(b) by 187 days.

(21) Appl. No.: 09/771,615

(22) Filed: Jan. 30, 2001

(65) Prior Publication Data

US 2002/0101045 A1 Aug. 1, 2002

(51) Int. Cl.[7] .......... B62B 11/00

(52) U.S. Cl. .......... 280/47.34; 280/35; 280/651; 280/47.35

(58) Field of Search .......... 280/35, 651, 652, 280/43.1, 43.14, 43.17, 43.2, 43.22, 43.23, 43.24, 47.17, 47.2, 47.24, 47.26, 47.34; 414/222.01, 222.03, 354, 539; 269/17; 248/129, 672

(56) References Cited

U.S. PATENT DOCUMENTS 3,570,565 A * 3/1971 Morgan .......... 144/1.1
4,353,182 A * 10/1982 Junkas et al. .......... 206/315.11
5,257,892 A * 11/1993 Branch .......... 280/30
5,305,544 A * 4/1994 Testa, Jr. .......... 206/315.11
5,323,879 A * 6/1994 Poulin .......... 188/19
5,337,810 A * 8/1994 McCormack .......... 144/193.1
5,536,034 A * 7/1996 Miller .......... 108/11
5,570,990 A * 11/1996 Bonora et al. .......... 269/17
5,709,397 A * 1/1998 Hall .......... 280/47.17
5,725,037 A * 3/1998 Faulhaber .......... 144/285
5,727,844 A * 3/1998 O'Quinn et al. .......... 206/216
5,775,865 A * 7/1998 Capilupi, Jr. .......... 280/47.2
5,816,433 A * 10/1998 Higgins .......... 220/503
6,170,839 B1 * 1/2001 Kizewski .......... 280/47.19
6,412,764 B1 * 7/2002 Hebert .......... 269/246

* cited by examiner

*Primary Examiner*—Brian L. Johnson
*Assistant Examiner*—Bridget Avery

(57) ABSTRACT

An article of manufacture for storing, securing, moving and using a pipe and tube end preparation machine comprising a container including a bottom floor panel and upstanding spaced apart front and back wall panels joined about the perimeter of the floor panel with the wall panels joined together along their respective vertical edges and a lockable top lid panel pivotally attached at the top of the rear panel closing over container forming a secure enclosure with interior chamber containing a framework with a force assisted pivoting tool support for raising and lowering a pipe and tube machine between the storage position inside the container and the production position outside the container with reduced operator effort and providing a means of supporting and stabilizing the pipe and tube machine when in use and providing casters for mobility and handles for assisting mobility and providing a means for securing the container with contents during storage or transport.

14 Claims, 3 Drawing Sheets

MOBILE HEAVY TOOL LIFT AND SUPPORT WITH LOCKABLE STORAGE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains to the field of equipment storage devices. More particularly, this invention pertains to a device in which certain types of heavy tools may be moved to a work station, restrained from moving, the lid be swung open, and the heavy tool be raised up and supported in efficient operating position with reduced effort on a force assisted pivoting support arm and with like reduced effort lowered back into the container and secured against thievery or by moving into a secure location.

2. Description of Prior Art

More and more businesses are switching from engineering, installing and maintaining their own piping systems to companies that specialize in piping systems due to the high cost of equipment and professional labor specific in performing these tasks. These special companies, large or small, are comprised of small groups of hard working individuals that travel from place to place, are highly skilled in pipe and tube preparation and installation and are adept at using the special equipment and techniques for accomplishing these services.

The equipment used by these pipe and tube professionals includes but is not limited to pipe end threading machines for preparation of threaded joining of pipe and associated threaded fittings, pipe and tube end groove rolling machines for preparation of grooved fitting joining of pipe and tube and associated grooved fittings, and pipe and tube orbital cutting and beveling machines for preparation of joining by welding pipe and tube and associated weld fittings plus an assortment of machine support stands and tables, pipe and tube material support stands, hoisting equipment, drills, grinders, power cords and an assortment of pipe wrenches, wrenches, sockets, hand tools and the like. The pipe and tube end preparation machines are heavy and expensive devices required for the efficient installation of pipe and tube systems and thus require a certain amount of special handling and secure storage. In many companies the equipment required for a job is transported to the jobsite and then must be relocated at the jobsite to a localized work area, assembled and used, then either disassembled and stored and secured at the work area, or disassembled and relocated to secured storage at the jobsite. In this manner localized work area efficiency is increased enough to offset and/or exceed assembly, disassembly and storage time. By this manner individual efforts are not restricted by inefficient long distance preparation and transportation to the localized work area of work pieces on what are quite often rather large and complex jobsites.

Seven problems are encountered by the company described. The first is inefficiency. The designs of pipe and tube end preparation machines are such that they are constructed in a rigid manner for performing their individual task of threading, rolling, or cutting and are heavy and difficult to handle, transport and store. The assembly of a work station requires a worktable or stand substantial enough for holding the weight of the machine and resist movement during operation, and at least two individuals are required for physically lifting a heavy and awkward machine from storage to the table or stand and firmly secure in place for operation during the work period. At the end of the work period the reverse procedure happens thereby doubling the nonproductive time per day.

The second problem is the exposure of two employees to serious physical strain. By dividing the weight of a heavy tool between two employees in the first minutes of a work period increases probability of lost time back injuries thereby reducing crew efficiency and increasing insurance costs.

The third problem of exposure to serious physical strain is the possibility of a non-lost time injury which again causes inefficient labor and reduced profit margin due to lack of performance.

The forth problem of exposure to serious physical strain is the dropping of the machine either during an injury or by avoiding injury thereby damaging the machine causing inefficient downtime of the machine, expensive repairs to the machine and at worst case the replacement of the machine.

The fifth problem of exposure to serious physical strain is the postponing of workstation assembly until the employees feel they are sufficiently warmed up to avoid physical injury. In other words, the heaviest item is the last assembled thereby causing the entire crew to wait for preparation of the first pipe or tube end which extends nonproductive setup time to the entire crew.

The sixth problem of exposure to serious physical strain is the tendency of labor to avoid physical strain by not assembling and disassembling the machine thereby exposing an expensive machine to accidental damage and repair, vandalism and repair or theft and replacement.

The seventh problem is the difficult relocation of heavy tools from one work area to another during the work period. These moves double or more the nonproductive time of the equipment and the moving personnel.

Solving one problem seems to add to the magnitude of other problems. By reducing theft there is added exposure to injury and damage or by reducing exposure to injury thereby increasing the probability of theft and/or damage.

SUMMARY OF THE INVENTION

This invention is a unique article of manufacture in the form of a multi-use container designed for the pipe and tube professional and solves all the problems herein described. The three phases of the container operation are the storage phase, the transformation phase and the production phase.

In the storage phase of the invention the container secures and stores a pipe and tube endpreparation machine with enough room for storage of work area accessories such as machine accessories, lubricants, pipe and tube support stands, extension cords, hand tools and the like.

In the transformation phase one individual may move the container between storage area and work area or between work areas easily, unlock and open the lid, remove and set up power cord and pipe support stands, remove and install stabilizer arms in appropriate receivers at the bottom of an end panel, open a hinged access door at the top of the same end panel, raise the heavy machine on a force assisted pivoting tool support arm into operating position with greatly reduced physical effort, and close the lid on the container forming a stable flat work surface. All transformation being done by one individual, efficiently, with greatly reduced effort and in a timely fashion. The transformation from production back to storage is the reverse of the afore mentioned steps.

The production phase is simply the use of the machine and support equipment according to manufacturers directions and acceptable professional practices at a suitable work height for operator comfort, efficiency and safety.

The invention is an article of manufacture for storing, securing, moving and using a pipe and tube machine with work station accessories comprising a container including a bottom floor panel and upstanding spaced apart front and back wall panels and two end wall panels joined about the perimeter of the floor panel with the wall panels joined together along their respective vertical marginal edges forming a secure structure that defines an interior chamber. A top lid panel is pivotally attached at the back wall panel at the top edge and arranged for closing over the container and chamber within forming a secure enclosure. The front wall panel contains two tamper proof recessed padlock receptacles for locking the lid and securing the contents. The container has four casters of sufficient diameter for providing ease of mobility. The container has a handle on each of the end panels for assisting in moving and securing the container at a work station or storage area. The container has two stabilizing arm receivers attached on the bottom floor panel directly below one of the end wall panels, one near the front and one near the back of the container, for accepting stabilizer arms with a screw type adjustment for the stabilization of the container in the transformation and production phase of the invention. The interior chamber of the container holds a force assisted pivoting tool support arm with a heavy pipe and tube tool fastened on one end of the arm and the force applying device and retaining framework attached on the other end of the force assisted pivoting support arm with the retaining framework being attached on the bottom panel of the container. The end panel above the stabilizer arms has a hinged access door at the top of the end panel located in such a manner allowing the free opening of said door out of the way of the force assisted pivoting support arm upon raising into production position allowing the force assisted pivoting arm the ability of extending through the plane of the end wall thereby allowing the complete closing of the top lid while in the production position.

Accordingly, the main object of this invention is an article of manufacture designed as a cost effective, labor saving, injury avoiding and more efficient means of transporting, storing, securing, protecting and using heavy and expensive pipe and tube tools and accessories either in the shop or on a remote jobsite.

These and other objects of the invention may become apparent from a close reading of the detailed description of the preferred embodiment along with the drawings appended hereto.

DETAILED DESCRIPTION OF THE INVENTION

Figure 1:
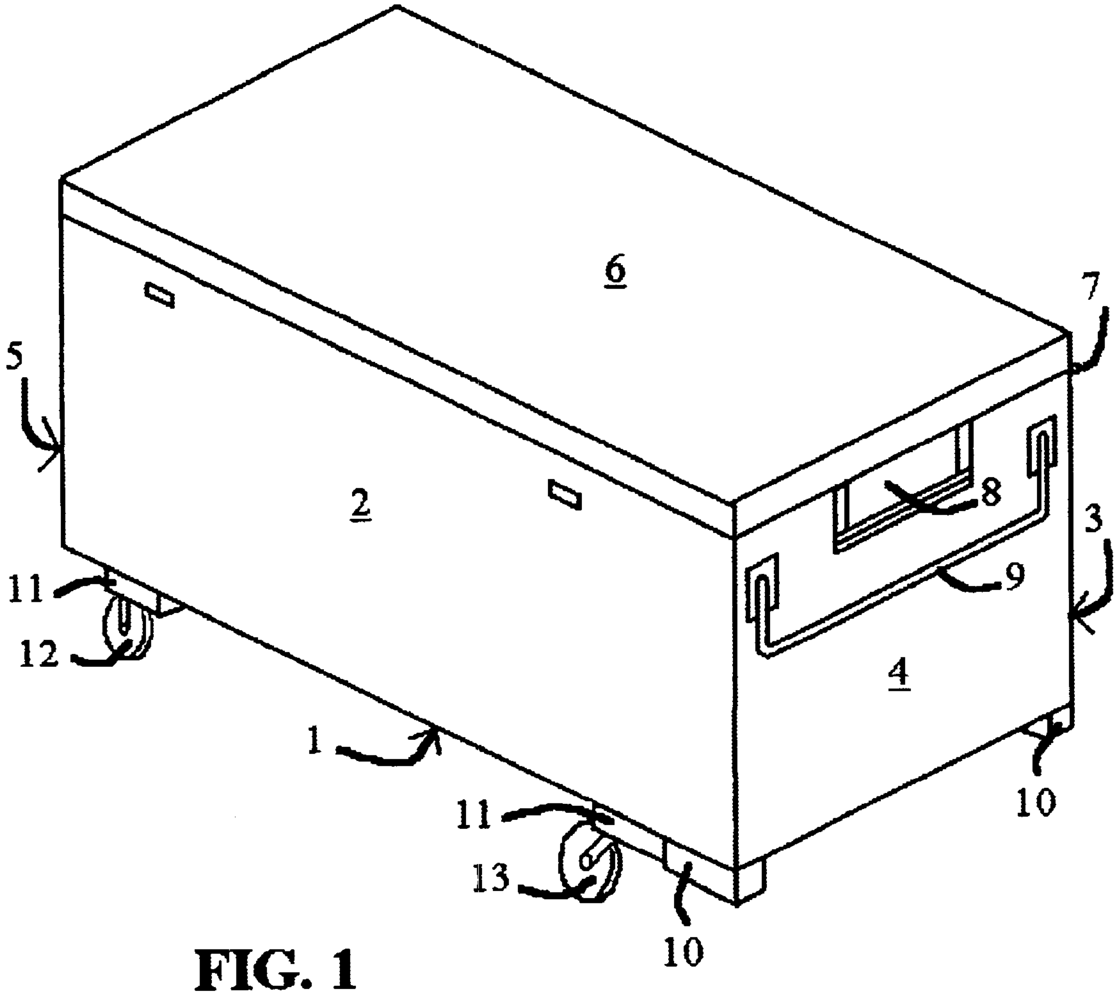
FIG. 1 is an isometric view of this invention in the storage position showing the preferred position of the external parts.
Figure 2:
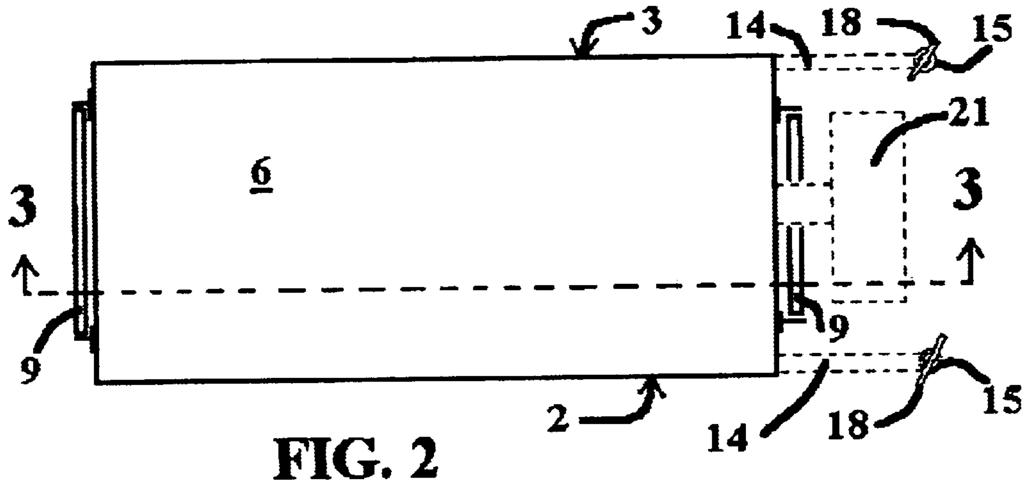
FIG. 2 is a plan view of this invention in the storage position with dashed lines showing the force assisted pivoting tool support and stabilizer arms in the production position and a sectional view line for FIG. 3.
Figure 3:
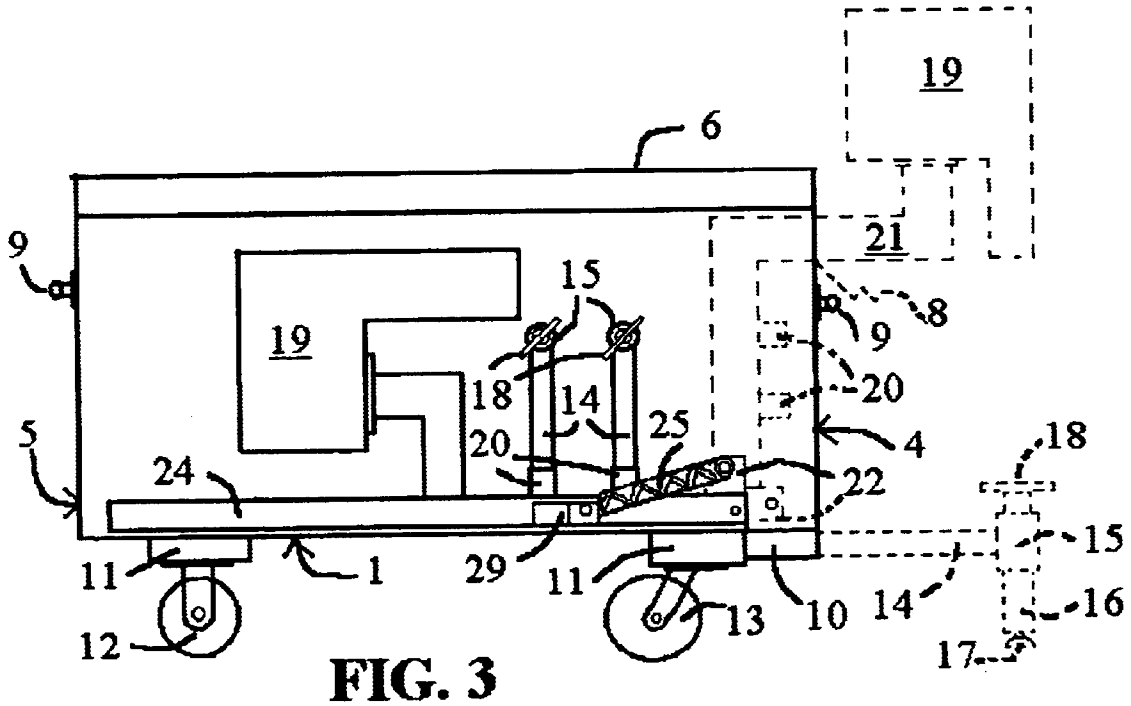
FIG. 3 is a sectional view of FIG. 2 showing the preferred storage position of the force assisted pivoting tool support arm, the stabilizing arms and an area showing available space for the heavy tool in the stored position with dashed lines showing the stabilizing arms, the force assisted pivoting tool support, the tool and the end panel hinged access door in the production position.
Figure 4:
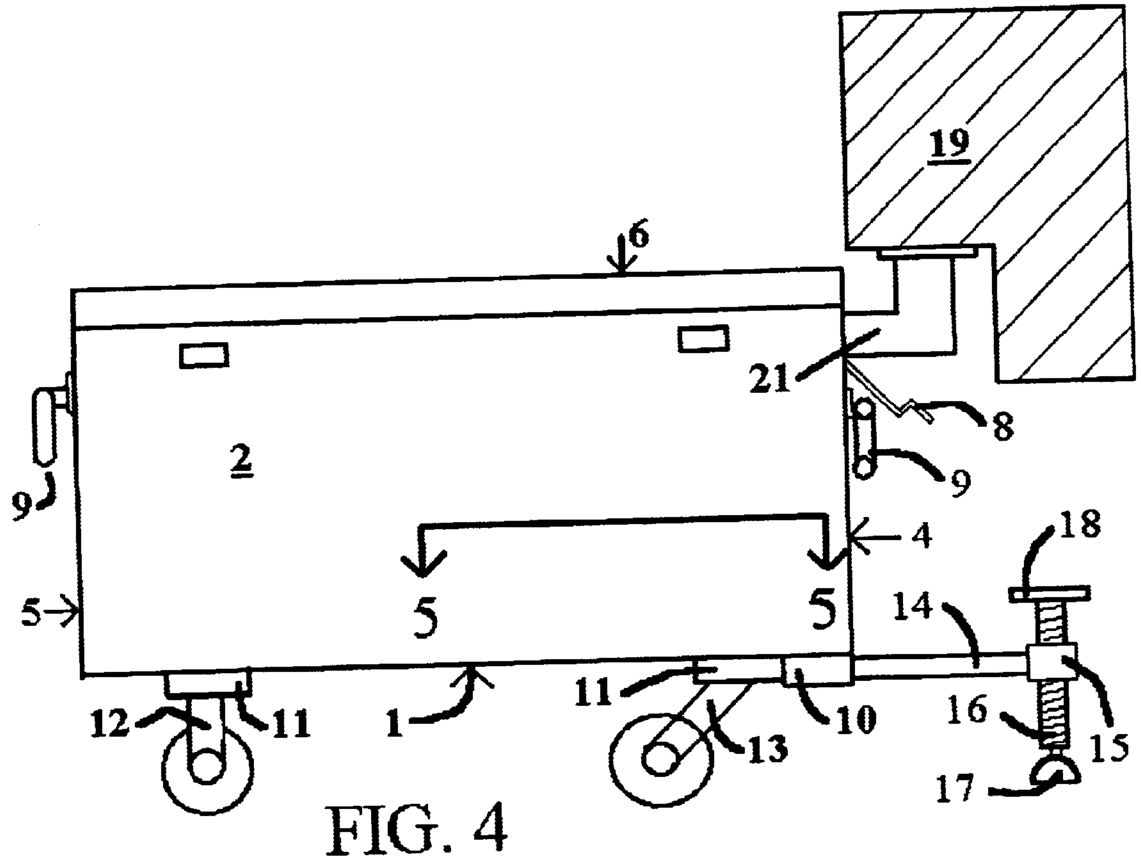
FIG. 4 is a front elevation showing the preferred production position of the invention with dashed lines showing a partial sectional view line for FIG. 5.
Figure 5:
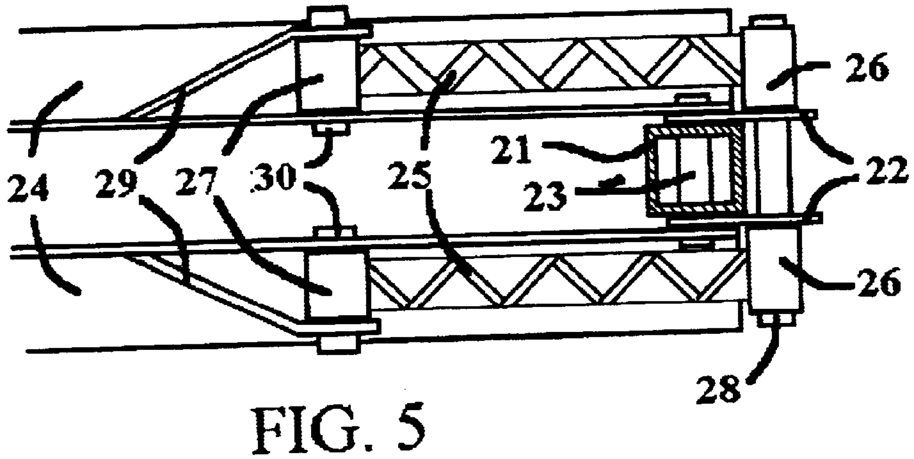
FIG. 5 is a partial sectional view of FIG. 4 showing the preferred arrangement of the force applying mechanism of the invention in the production position.

In the drawings, wherein elements are identified by numerals and like elements are identified by like numerals throughout the five figures, the preferred embodiment of the invention comprising the following elements being shown, a floor panel 1, a front side panel 2, an end panel 5, an end panel 4 and a rear side panel 3 all being joined together at their respective edges by welding, bolting or the like. A top lid panel 6 being provided of like finish size of the floor panel 1 being attached by hinge 7 on the top edge of the rear side panel 3 making top lid panel 6 pivotable about rear side panel 3 top edge. By closing top lid panel 6 over front side panel 2, rear side panel 3, end panel 5 and end panel 4 creating a secure enclosure by forming an inside chamber accessible through top lid panel 6. Top lid panel 6 is lockable but is not detailed because of the many means of securing and locking panels and doors. End panel 5 and end panel 4 each have a handle 9 for assisting an operator in relocating the invention or for securing the invention either during storage or transport. Further, end panel 4 includes a hinged access door 8 allowing the force assisted pivoting tool support penetration of the plane of end panel 4 without interfering with the operation of the top lid panel 6 in the production position as shown in FIG. 4. The floor panel 1 includes the attachment of production stabilizing arm receivers 10 located directly below end panel 4 and located as far front and rear as practical. The floor panel 1 includes stand offs 11 which allow for stiffening the floor panel 1, mounting of the straight casters 12 and swivel casters 13 and ease of fork lift insertion should the casters 12 and 13 not be used.

Stabilizing arms 14 are of the screw jack type with threaded piece 15, threaded rod 16, swivel floor pad 17 and handle 18. Stabilizing arms 14 inserted into production stabilizing arm receivers 10 and adjusted snug against the floor surface providing the necessary support for solid operation of the heavy tool 19 cantilevered through the plane of end panel 4 in the production position. In the storage position, stabilizing arms 14 inserted into storage stabilizing arm receivers 20 attached on the force assisted pivoting tool support 21 provide for efficient storage, easy access through the top lid panel 6 and safety by stopping the raising of the force assisted pivoting tool support 21 and the heavy tool 19 into production position until the stabilizing arms 14 are removed and installed in the production stabilizer arm receivers 10.

The force assisted pivoting tool support 21 is a square steel tube with a heavy tool 19 attached on one end and pivoting plates 22 attached on the other end. The pivoting plates 22 are plate steel and are joined with the angle iron retaining frames 24 by using a pivoting axle 23 thus providing a secure means of rotating the pivoting plates 22, the force assisted pivoting tool support 21 and the heavy tool 19 between the storage position and the production position. The force cartridge 25 is a compression spring with an arm axle collar 26 attached at one end and a frame axle collar 27 attached at the other end. The force cartridges 25 are joined with the pivoting plates 22 by using an arm force axle 28 inserted through the pivoting plates 22 and the arm axle collars 26, and are joined with the retaining frames 24 and frame axle supports 29 by using frame force axles 30 inserted through the retaining frames 24, the frame axle supports 29 and the frame axle collars 27. The frame axle supports 29 are plate steel and are securely attached on retaining frames.

The operation of the preferred embodiment of the invention storage procedure is described as follows starting with the invention in the production position. The top lid 6 of the enclosure is pivoted open on hinge 7 exposing the inside chamber. The heavy tool 19, the force assisted pivoting tool support 21 and the pivoting plates 22 are rotated into the chamber on pivoting axle 23. As the pivoting plates 22 rotate around pivoting axle 23, towards the storage position, the linear distance between arm force axle 28 and frame force axles 30 is reduced thereby compressing the springs and storing great force. Further, as this rotation occurs the line of stored force of the springs, which acts through the centerlines of the force cartridges 25, increases the perpendicular distance between the line of force and the pivoting axle 28 thereby increasing torque. Therefore, as the heavy tool 19 is lowered into the chamber the torque generated increases, as described above, acting through the pivoting plates 22 and the force assisted pivoting tool support 21 around the pivoting axle 23 effectively counterbalancing most, if not all, the weight of the heavy tool 19 as it is progressively lowered toward the storage position. This counterbalancing does two things, first, it reduces or eliminates the restraining effort of the operator in storing the heavy tool, and second, it reduces or eliminates the lifting effort required for production setup. Once the tool 19 is in the storage position the stabilizing arms 14 are removed from the production stabilizing arm receivers 10 and placed in the storage stabilizing arm receivers 20. The hinged access door 8 is swung up into the closed position. The top lid 6 pivoted down closing the chamber and is locked thereby securing the chamber.

The production position is attained by reversing the afore mentioned storage procedure.

By describing the invention, referencing a particular embodiment, modification within the true spirit and scope of the invention by those skilled in the art are obvious. It is intended that all combinations of elements and procedures performing the same function in the same way for achieving the same result are within the scope of this invention.

What is claimed is:

1. An article of manufacture for storing, securing, moving and using a pipe and tube machine therein, comprising:

a) a container including a floor panel and upstanding spaced apart front and rear side panels and upstanding end panels joined about the perimeter of the floor panel with the upstanding panels joined together along their respective vertical marginal edges;

b) a top lid panel of like finish size as said floor panel being attached by a hinge on the top edge of said rear side panel making said top lid panel pivot about the axis formed by said top edge of rear side panel and forming a secure enclosure having an interior chamber by closing said top lid panel over said container;

c) end panels each having a handle;

d) a hinged access door providing a means of penetrating the plane of an end panel without interfering with pivoting of said top lid panel about the axis formed by said hinge;

e) a mounting means for casters on said container wherein said mounting means for casters on said container comprising multiple purpose attachment allowing for the stiffening of said floor panel and including sufficient height for stand offs allowing fork lift transport and providing a solid base for mounting said casters;

f) a stabilizing means for said container;

g) a storage means for said stabilizing means;

h) a force assisted pivoting tool support being joined with a retaining frame in a manner for providing a secure means for rotating a heavy tool between a storage position in said interior chamber of said container and a cantilevered production position external of the vertical plane of said end panel of said container with the pivoting tool support extending through said access door;

i) at least one force cartridge being joined with said retaining frame and said force assisted pivoting tool support in a manner for creating sufficient offsetting force for reducing effort for rotating said heavy tool between said storage position and said production position.

2. The article of claim 1 wherein said mounting means for casters on said container comprising said floor panel including stand offs for mounting said casters.

3. The article of claim 1 wherein said stabilizing means of said container comprising at least one easily removable stabilizing arm of sufficient length for providing necessary support for solid operation of said heavy tool in said cantilevered production position and at least one production stabilizing arm receiver allowing easy attachment and release of said stabilizing arm with said container.

4. The article of claim 1 wherein said stabilizing means of said container comprising at least one attaching point for at least one said stabilizing arm.

5. The article of claim 1 wherein said storage means for said stabilizing arm comprising at least one storage stabilizing arm receiver being attached on said force assisted pivoting tool support allowing inserting of said stabilizing arm in said storage stabilizing arm receiver in said storage position.

6. The article of claim 1 wherein said force assisted pivoting tool support comprises at least one rigid square tubing.

7. The article of claim 1 wherein said retaining frame comprises at least one rigid angle member.

8. The article of claim 1 wherein said manner for providing secure means for rotating comprises at least one pivoting axle.

9. The article of claim 1 wherein said force cartridge comprising a means of exerting great force.

10. The article of claim 1 wherein said force cartridge is joined with said retaining frame and said force assisted pivoting tool support comprising at least one force axle.

11. The article of claim 2 wherein said stand offs allow for stiffening of said floor panel.

12. The article of claim 3 wherein said stabilizing arm comprising a length of tube extending past the center of gravity when said heavy tool is in said cantilevered production position, a threaded piece, a threaded rod, a swivel floor pad and an adjusting handle.

13. The article of claim 4 wherein said attaching point for said stabilizing arm comprising a production stabilizing arm receiver for inserting said stabilizing arm for support of said heavy tool in said production position.

14. The article of claim 9 wherein said means of exerting great force comprising a spring.

* * * * *